United States Patent [19]
Maurilio et al.

[11] Patent Number: 4,731,003
[45] Date of Patent: Mar. 15, 1988

[54] EXTRUDER HEAD FOR EXTRUDING SHEET OR FILM

[76] Inventors: Fare' Maurilio, Via Pastrengo 31/33, 21054 Fagnano Olona (Milano); Faré Rosaldo, Via Pastrengo 13/33, 21054 Fagnano Olono (Milano), both of Italy

[21] Appl. No.: 926,957

[22] Filed: Nov. 4, 1986

[30] Foreign Application Priority Data

Jul. 29, 1986 [IT] Italy ............... 21300 A/86

[51] Int. Cl.$^4$ ............................................. B29C 47/14
[52] U.S. Cl. ............................. 425/133.5; 425/376 R; 425/462
[58] Field of Search ........... 425/133.5, 462, 461, 425/376 R, 376 A, 376 B; 264/171, 177.1

[56] References Cited

U.S. PATENT DOCUMENTS

| | | | |
|---|---|---|---|
| 3,191,228 | 6/1965 | Schluter | 425/461 X |
| 3,405,425 | 10/1968 | Buckley et al. | 425/133.5 |
| 3,684,422 | 8/1972 | Huesing | 425/461 X |
| 3,687,589 | 8/1972 | Schrenk | 425/133.5 X |
| 3,761,211 | 9/1973 | Parkinson | 425/133.5 |
| 3,807,918 | 4/1974 | Chill et al. | 425/133.5 |
| 4,128,386 | 12/1978 | Wissinger et al. | 425/462 |
| 4,152,387 | 5/1979 | Cloeren | 425/133.5 X |
| 4,161,385 | 7/1979 | Goldstein et al. | 425/133.5 X |
| 4,435,141 | 3/1984 | Weisner et al. | 425/462 X |
| 4,600,550 | 7/1986 | Cloren | 264/171 |

Primary Examiner—Richard L. Chiesa
Attorney, Agent, or Firm—Bucknam and Archer

[57] ABSTRACT

A flat extruder head for extruding plastics materials in the form of sheet or film is constructed in such a way as to guarantee a constant thickness along the whole of the width of the extruded sheet or film: this is achieved by the provision of two or more ducts for conveying the plastics material to be extruded to a product output slot. The material is expelled to a uniform pressure from these ducts by means of suitable devices, in such a way as to present a constant coefficient of flow along the entire extent of the slot itself.

1 Claim, 2 Drawing Figures

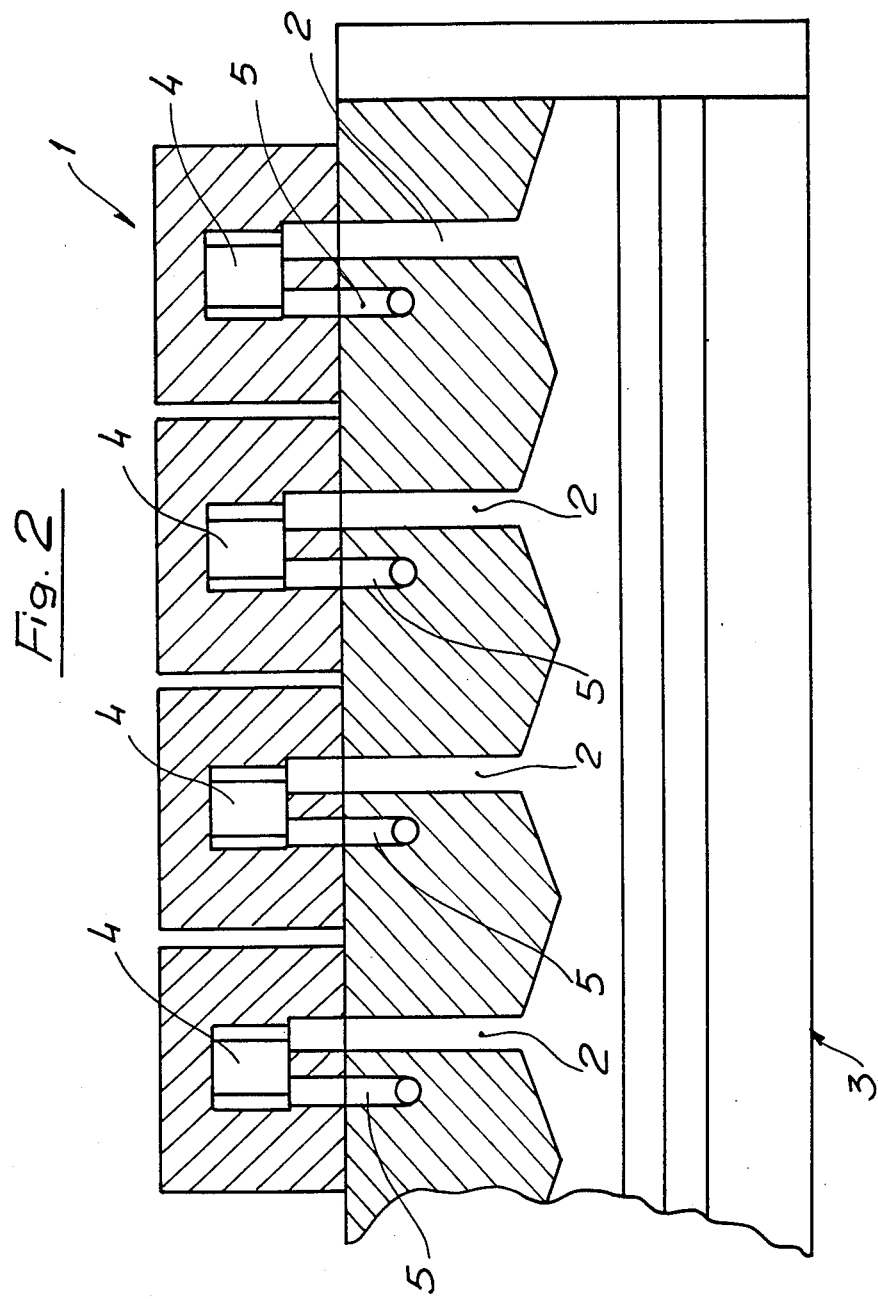

EXTRUDER HEAD FOR EXTRUDING SHEET OR FILM

BACKGROUND OF THE INVENTION

In the production of sheets and films of thermoplastics material it is known to use extruders provided with flat extruder heads having an extruder slot defined between two lips. Currently, such extruder heads are supplied with material to be extruded through a single duct leading to a point mid way along the length of the slot. Consequently, when heads of a very considerable width are used it is practically impossible, given the differences in flow rate of the material at the points laterally spaced of the outlet of the feed duct to obtain sheets or films having a constant thickness.

There are, indeed, provided various structural arrangements acting to minimise the said dimensional variations in the manufactured product. Such arrangements, however, are in general concerned with means for making mechanical adjustments, directed at modifying the mutual separation of the two lips defining the plastics material extrusion slot. Moreover, such mechanical adjustment means only allow operation of the extruder by trial and error methods and consequently do not permit the slot to be arranged in such a way that it guarantees the uniformity of the product obtained in all circumstances.

Alternatively, it is known to provide heater means acting in cooperation with the said mechanical slot width adjustments means, or instead of such means. Extrusion heads may also have various differentiated heating zones acting to correct possible differences in the flow of the material. However, adjustment of the head is extremely laborious and it can be very difficult to obtain the desired result. When differentiated heating of the various zones of the slot is employed, moreover, it is necessary to provide electronic apparatus of considerable cost and, in general, great delicacy.

OBJECTS OF THE INVENTION

A primary object of the present invention is to overcome the disadvantages of the prior art extruders by providing a flat extruder head for extruding thermoplastics materials into sheet or film, which is able to guarantee, within wide limits, the production of film or sheet of constant thickness.

Another object of the present invention is to provide a flat extrusion head which can be easily adapted to the specific precision requirements required for the finished product.

A further object of the present invention is to provide a flat extruder head which is constructionally simple and highly reliable.

SUMMARY OF THE INVENTION

The present invention provides a flat extruder head for extruding thermoplastics material into sheet or film, comprising an extruder head body having an elongate slot through which, in use of the extruder head, plastics material is extruded into sheet or film, the slot communicating with a source of plastics material in a plastic state via two or more feed ducts for conveying the plastics material to the output slot, and means for conveying the plastics material through the feed ducts to the slot in such a way that it flows through the slot with a substantially constant coefficient of flow along the entire length of the slot.

Various other features and advantages of the present invention will become more clearly apparent from a study of the following description in which reference is made to the accompanying drawings, provided purely by way of non limitative example.

BRIEF DESCRIPTION OF THE DRAWINGS

FIG. 2 is a longitudinal section through a portion of the flat extruder head shown in FIG. 1.

DESCRIPTION OF THE PREFERRED EMBODIMENTS

Figure 1:
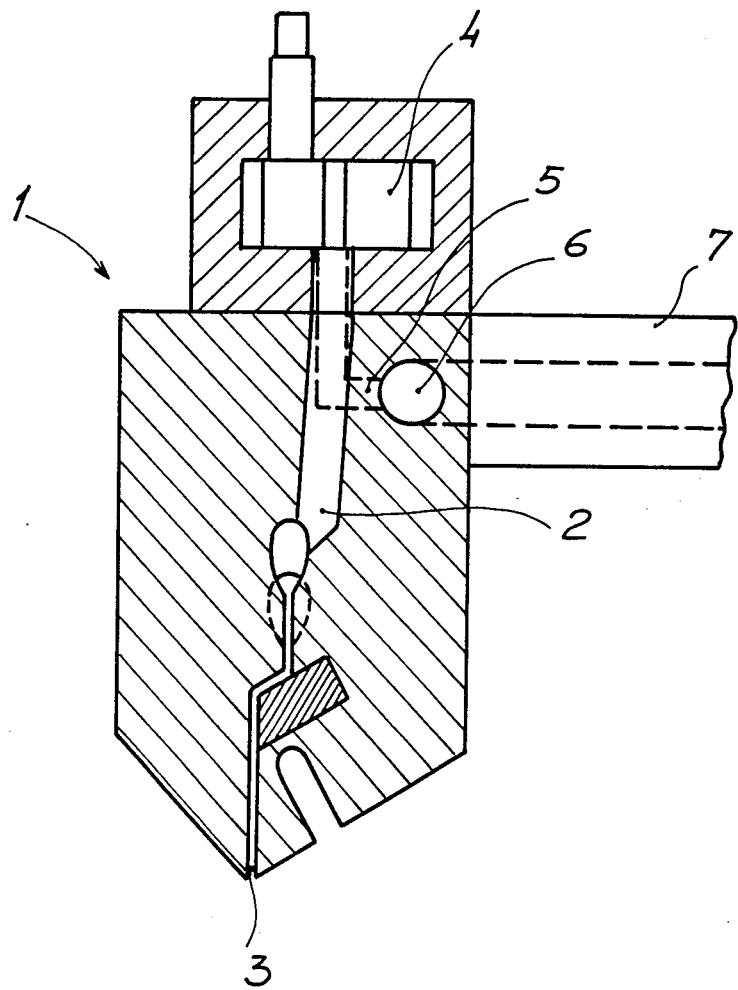
FIG. 1 is a schematic transverse section of a flat extruder head formed as an embodiment of the invention.

Referring now to the drawings a flat extruder head, generally indicated 1, is provided with a plurality of ducts 2 for conveying the material to be extruded to a sheet or film output slot 3 which is adjustable in thickness.

As can be seen in FIG. 2 these ducts have a regularly spaced arrangement and extend along axes orthogonal to the length of the output slot.

As shown in FIGS. 1 and 2 each of the said ducts 2 is located downstream of its own associated volumetric pump 4 which draws the material to be extruded through a passage 5 from a main duct 6 extending longitudinally of the head and supplied by a main feed pipe 7. The number of ducts 2 supplying the plastics material to the slot may be different from that shown, in dependence on the dimensions and finish of the finished product, as well as the production tolerances.

In use of the extrusion head illustrated it is possible to actuate all of the said volumetric pumps or to put into operation only a limited number of these, again as a function of the specifically required physical characteristics of the sheet or film to be produced.

What is claimed is:

1. A flat extruder head for extruding thermoplastics material into sheet or film, comprising;
    an extruder head body,
    means defining an elongate product output slot in said extruder head body through which slot, in use of said extruder head, plastics materal is extruded into sheet on film,
    a source of plastics material in a plastic state,
    plastics material conveyance ducts for conveying said plastics material from said source of plastics material to said output slot, said plastics material conveyance ducts including a plurality of feed ducts communicating with said slot,
    means for causing the plastics material to flow through said plastics material feed ducts to said slot in such a way that said plastics material flows through said slot with a substantially constant coefficient of flow along the entire length of said slot,
    said feed ducts being spaced regularly along said extruder head body, and each said feed duct having an axis extending orthogonally with respect to the length of the output slot,
    said plastics material conveyance ducts further including a main duct extending longitudinally of said extruder head body and in communication with said source of plastics material, and a plurality of transfer ducts in communication with said main duct, said means for causing said plastics material to flow through said feed ducts comprising a plurality of respective associated volumetric pumps which operate to draw said plastics material to be extruded through said transfer ducts from said main duct extending longitudinally of said extruder head body, said main duct, transfer ducts, feed ducts and volumetric pumps being all located within said extruder head, said volumetric pumps being positioned between their respective transfer ducts and feed ducts.

* * * * *